United States Patent
Baik et al.

(10) Patent No.: US 7,735,137 B2
(45) Date of Patent: Jun. 8, 2010

(54) METHOD AND APPARATUS FOR STORING INTRUSION RULE

(75) Inventors: Kwang Ho Baik, Daejeon (KR); Byoung Koo Kim, Daejeon (KR); Jin Tae Oh, Daejeon (KR); Jong Soo Jang, Daejeon (KR); Sung Won Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 986 days.

(21) Appl. No.: 11/484,257

(22) Filed: Jul. 10, 2006

(65) Prior Publication Data

US 2007/0124815 A1    May 31, 2007

(30) Foreign Application Priority Data

Nov. 25, 2005   (KR) .................... 10-2005-0113476

(51) Int. Cl.
  *G06F 11/00* (2006.01)
  *G06F 12/14* (2006.01)
  *G06F 12/16* (2006.01)
  *G08B 23/00* (2006.01)

(52) U.S. Cl. ............................ 726/23; 726/22; 726/24; 726/25; 713/187; 713/188; 713/193; 713/194

(58) Field of Classification Search .................... 726/23; 713/187–188, 193–194, 22–25
  See application file for complete search history.

(56) References Cited

U.S. PATENT DOCUMENTS 7,487,542 B2 *   2/2009   Boulanger et al. ............ 726/23

(Continued)

FOREIGN PATENT DOCUMENTS

KR   10-2004-0046465 A   6/2004

(Continued)

OTHER PUBLICATIONS

Rong-Tai Liu, et al., "A Fast Pattern-Match Engine for Network Processor-based Network Intrusion Detection System", IEEE Computer Society, Proceedings of the International Conference on Information Technology: Coding and Computing (ITCC'04) 0-7695-2108-8/04; 2004 IEEE (5 pages).

(Continued)

*Primary Examiner*—Emmanuel L Moise
*Assistant Examiner*—Jing Sims
(74) *Attorney, Agent, or Firm*—Blakely, Sokoloff, Taylor & Zafman LLP

(57) ABSTRACT

A method and apparatus for storing an intrusion rule are provided. The method stores a new intrusion rule in an intrusion detection system having already stored intrusion rules, and includes: generating combinations of divisions capable of dividing the new intrusion rule into a plurality of partial intrusion rules; calculating the frequency of hash value collisions between each of the generated division combinations and the already stored intrusion rules; dividing the new intrusion rule according to the division combination which has the lowest calculated frequency of hash value collisions; and storing the divided new intrusion rule in a corresponding position of the intrusion detection system. According to the method and apparatus, the size of the storage unit occupied by the intrusion rule can be reduced, and by performing pattern matching, the performance of the intrusion detection system can be enhanced.

7 Claims, 6 Drawing Sheets

U.S. PATENT DOCUMENTS

2003/0115486 A1* 6/2003 Choi et al. .................. 713/201
2005/0125551 A1* 6/2005 Oh et al. ..................... 709/230
2007/0124815 A1* 5/2007 Baik et al. ................... 726/23

FOREIGN PATENT DOCUMENTS

KR 1020050054538 A 6/2005
KR 10-2006-0013815 A 2/2006

OTHER PUBLICATIONS

C. Jason Coit, et al., "Towards Faster String Matching for Intrusion Detection or Exceeding the Speed of Snort", 0-7695-1212-7/01—2001 IEEE (pp. 367-373).

* cited by examiner

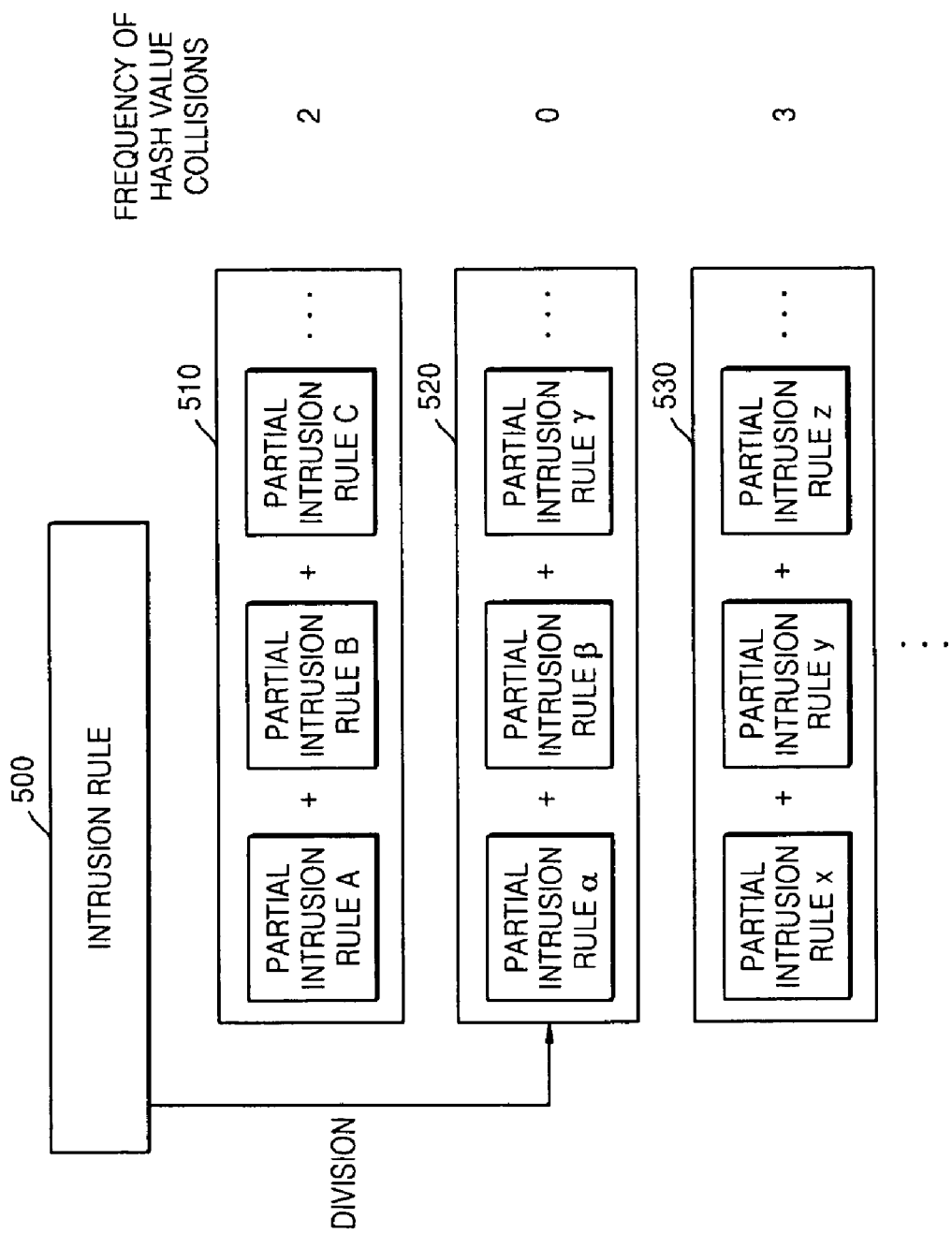

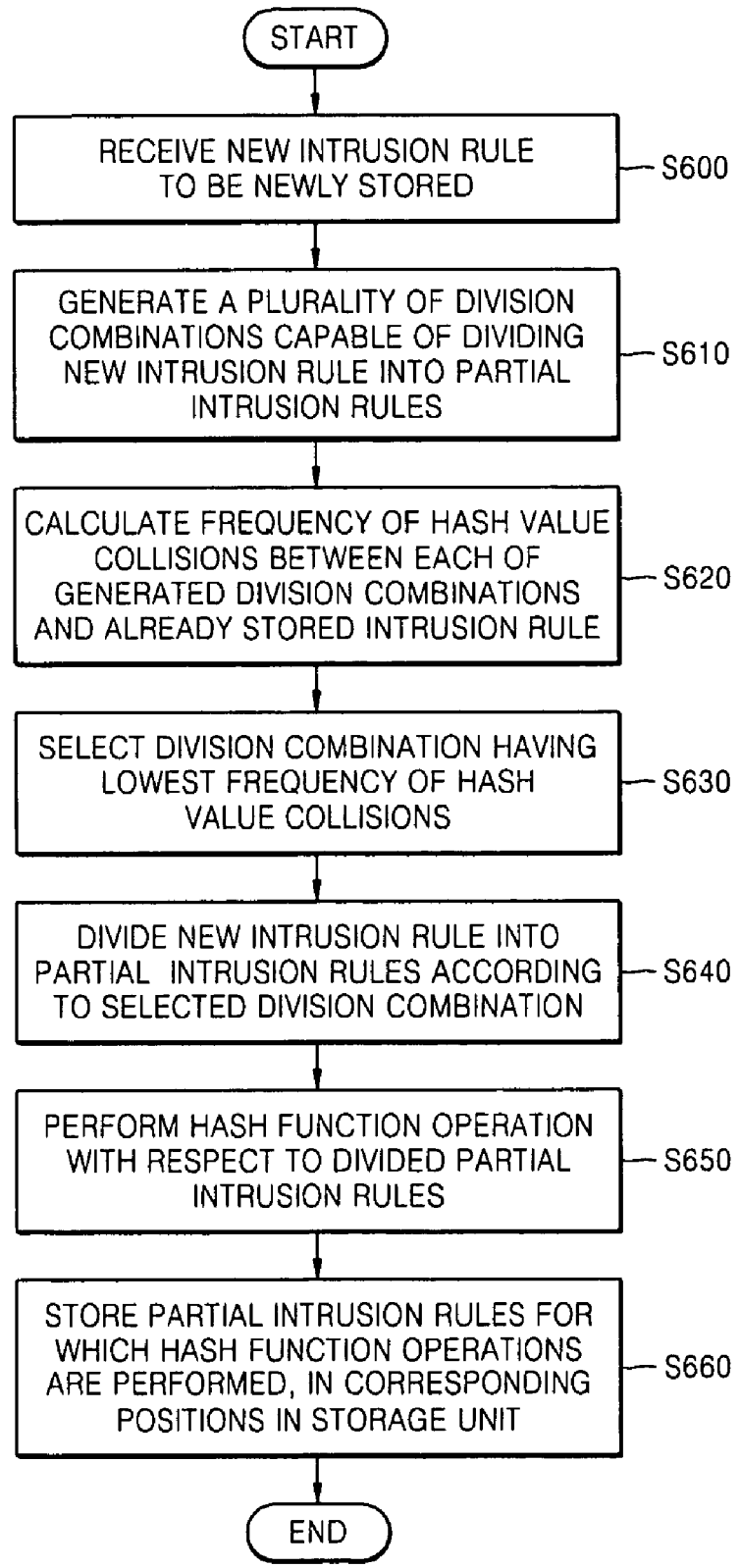

METHOD AND APPARATUS FOR STORING INTRUSION RULE

CROSS-REFERENCE TO RELATED PATENT APPLICATIONS

This application claims the benefit of Korean Patent Application No. 10-2005-0113476, filed on Nov. 25, 2005, in the Korean Intellectual Property Office, the disclosure of which is incorporated herein in its entirety by reference.

BACKGROUND OF THE INVENTION

1. Field of the Invention

The present invention relates to a method and apparatus for storing an intrusion rule, and more particularly, to a method and apparatus for storing an intrusion rule which uses an optimized hash function table to implement a hash function in a high-speed hardware-based intrusion detection system for detecting network intrusions in real time, to minimize the memory use, enhance the performance and decrease the size of the intrusion detection system.

2. Description of the Related Art

Information exchange through networks is now one of the major features of modern society, and influences many aspects of life. Malicious information intrusion has increased accordingly and become a substantial threat to society as a whole. Therefore it is becoming more important to protect information systems including networks.

The object of a network intrusion detection system is to detect certain packets traveling through a network. This is because in an actual intrusion attempt, packets are transmitted through a network. The most widely used intrusion detection method is a pattern matching method based on an intrusion rule.

An intrusion rule is a set of characteristics of known intrusions. These characteristics include a variety of items, including source and destination addresses of packets, types of protocols, values of predetermined fields, and information on whether or not predetermined bytes are included. All these items indicate values or ranges within the protocol header or payload of a packet.

Accordingly, if each item of the intrusion rule is compared with a packet and examined, it can be accurately determined whether or not the packet is part of an intrusion. That is, the pattern matching method based on the intrusion rule can be said to determine whether or not a packet passing through a network is part of an intrusion by comparing and examining data of the packet which actually passes through the network with the corresponding rule defined in relation to intrusion.

An intrusion detection system to protect a high-speed network is generally based on hardware. This is because high-speed detection is required in order to detect intrusion in real time for a Gigabit or higher level network, and the performance of a software based intrusion system is limited. In order to provide a high-speed rule-based intrusion detection function in a hardware-based intrusion detection system, high speed operation of the intrusion detection system is essential.

A variety of research to speed up the intrusion detection function has been undertaken, and at present, the performance of pattern matching using a hash function is known to be good. In the pattern matching using the hash function, comparison of patterns is performed through calculation, and the complexity of the comparison itself is beneficially low.

Problems with this method are that collisions of the hash function must be prevented, and the size of the hash function table must be reduced.

If the size of the hash function table increases, the size of a memory required for pattern matching increases. In a hardware-based system, the complexity and cost of implementation increase as the memory size increases. Therefore, it has become important to reduce of the size of the hash function table and thus the size of the memory used by the pattern matching function.

SUMMARY OF THE INVENTION

The present invention provides a method and apparatus for reducing the size of a hash function table when an intrusion rule is stored in a memory using a hash function in an intrusion detection system for detecting an intrusion through pattern matching based on predefined intrusion rules.

The present invention also provides a method and apparatus by which when an intrusion rule is divided and stored in a memory, hash values of all possible cases with respect to intrusion rule division are calculated and the intrusion rule is divided and stored in a storage unit so that collisions between the calculated hash values and the hash values of other already stored intrusion rules are minimized.

According to an aspect of the present invention, there is provided an intrusion rule storing method for storing a new intrusion rule in an intrusion detection system having already stored intrusion rules, the method including: generating combinations of divisions capable of dividing the new intrusion rule into a plurality of partial intrusion rules; calculating the frequency of hash value collisions between each of the generated division combinations and the already stored intrusion rules; dividing the new intrusion rule according to a division combination having the lowest calculated frequency of hash value collisions; and storing the divided new intrusion rule in a corresponding position of the intrusion detection system.

According to another aspect of the present invention, there is provided an intrusion rule storing apparatus including: a storage unit already storing intrusion rules; a division combination generation unit generating division combinations capable of dividing a new intrusion rule to be newly stored, into a plurality of partial intrusion rules; a hash value collision calculation unit calculating the frequency of hash value collisions between each of the division combinations generated in the division combination generation unit, with the intrusion rules already stored in the storage unit; and a division unit dividing the new intrusion rule according to the division combination having the lowest frequency of the calculated hash value collisions

BRIEF DESCRIPTION OF THE DRAWINGS

The above and other features and advantages of the present invention will become more apparent by describing in detail exemplary embodiments thereof with reference to the attached drawings in which:

FIG. 5 illustrates a method of minimizing collisions of hash values in the hash value collision calculation unit of FIG. 1 according to an embodiment of the present invention; and FIG. 6 is a flowchart of a method of storing an intrusion rule according to an embodiment of the present invention.

DETAILED DESCRIPTION OF THE INVENTION

The present invention will now be described more fully with reference to the accompanying drawings, in which exemplary embodiments of the invention are shown.

Figure 1:
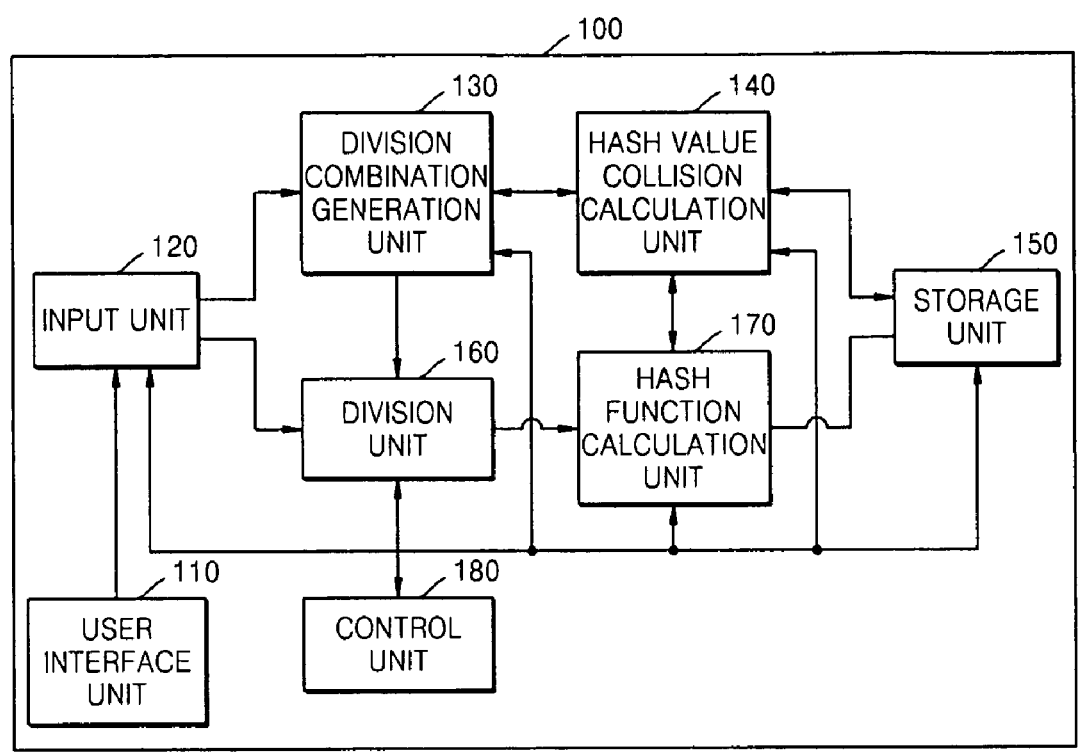
FIG. 1 is a block diagram of an intrusion rule storing apparatus according to an embodiment of the present invention.

FIG. 1 is a block diagram of an intrusion rule storing apparatus according to an embodiment of the present invention. Referring to FIG. 1, the intrusion rule storing apparatus 100 is composed of a user interface unit 110, an input unit 120, a division combination generation unit 130, a hash value collision calculation unit 140, a storage unit 150, a division unit 160, a hash function calculation unit 170, and a control unit 180.

FIG. 1 relates to a high-speed pattern matching method and apparatus using a hardware-based hash function. A hash function is very effective at comparing data but can suffer from collision of hash values.

The user interface unit 110 receives from a user a new intrusion rule to be stored in the intrusion rule storing apparatus 100 and outputs the rule to the input unit 120.

The input unit 120 receives the new intrusion rule through the user interface unit 110. Though it is explained with reference to FIG. 1 that the new intrusion rule is received through the user interface unit 110, it may be directly input from an external device connected through a wired or wireless network, in another embodiment.

The division combination generation unit 130 receives the new intrusion rule from the input unit 120, and generates a plurality of division combinations capable of dividing the input new intrusion rule into partial intrusion rules. Also, the division combination generation unit 130 outputs a selected division combination input from the hash value collision calculation unit 140, to the division unit 160.

The hash value collision calculation unit 140 calculates the frequency of hash value collisions between each of the plurality of division combinations generated in the division combination generation unit 130, and intrusion rules already stored.

Then, the hash value collision calculation unit 140 selects the division combination which has the lowest frequency of hash value collisions, and outputs the selected combination to the division combination generation unit 130.

The calculation of the frequency of hash value collisions by the hash value collision calculation unit 140 will now be explained.

The hash value collision calculation unit 140 outputs partial intrusion rules included in each of the division combinations, to the hash function calculation unit 140, and receives hash values from the hash function calculation unit 140. Then, by counting the frequency of collisions between the received hash values and hash values already stored in the storage unit 150, the hash value collision calculation unit 140 calculates the frequency of hash value collisions.

The storage unit 150 already stores intrusion rules such that each of the intrusion rules is divided into a plurality of intrusion rules. Also, under the control of the control unit 180, the storage unit 150 receives partial intrusion rules of an intrusion rule to be newly stored, and stores the received partial intrusion rules.

The division unit 160 receives a new intrusion rule from the input unit 120, and receives a selected division combination from the division combination generation unit 130. Then, the division unit 160 divides the new intrusion rule into partial intrusion rules according to the selected division combination.

The hash function calculation unit 170 calculates a hash function with respect to each of the partial intrusion rules divided by the division unit 160.

The control unit 180 controls the elements of the intrusion rule storing apparatus 100, so that the partial intrusion rules for which hash function calculations are performed in the hash function calculation unit 170 can be stored at corresponding positions in the storage unit 150.

Figure 2:
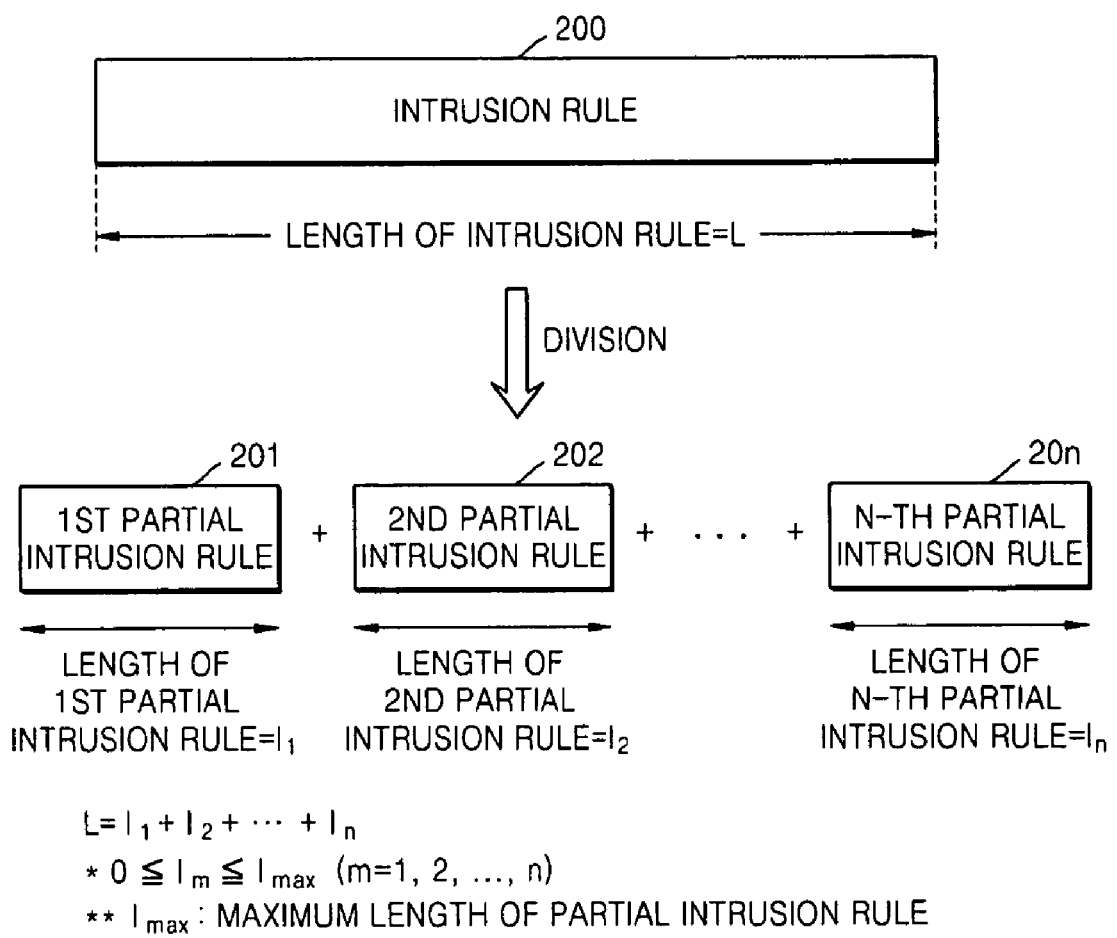
FIG. 2 illustrates dividing an intrusion rule in a division unit of FIG. 1 according to an embodiment of the present invention.

FIG. 2 illustrates dividing an intrusion rule in the division unit 160 of FIG. 1 according to an embodiment of the present invention.

Referring to FIG. 2, it can be seen that the intrusion rule 200 is divided into a first partial intrusion rule 201, a second partial intrusion rule 202, ..., an n-th partial intrusion rule 20n. Each partial intrusion rule is stored in the storage unit 150.

Here, there is no limit to the length of the intrusion rule 200. In general, the size of the intrusion rule 200 ranges from bytes to tens of bytes, but there may be a much longer intrusion rule 200. Accordingly, to allow the intrusion detection system to work with an intrusion rule 200 with a variable length, the intrusion rule 200 is divided and stored in the storage unit 150.

Assuming that the length of the intrusion rule 200 is L, and the length of the first partial intrusion rule 201 is l1, the length of the second intrusion rule 202 is l2, ..., and the length of the n-th intrusion rule 20n is ln, the relationship can be expressed as the following equation 1:

$$L = l1 + l2 + \ldots + ln \quad (1)$$

The length of each of the first partial intrusion rule 201, the second partial intrusion rule 202, ..., the n-th partial intrusion rule 20n may be equal to or shorter than the length lmax of a predetermined division rule having a maximum length. This relationship can be expressed as the following expression 2:

$$0 \leq lm \leq lmax \quad (2)$$

where the maximum length lmax of a partial intrusion rule is determined according to an intrusion detection system. When an intrusion detection system uses a hash function, a partial intrusion rule becomes a basic unit for calculating a hash value. Since the length L of the intrusion rule 200 described above as an example may vary, the intrusion rule 200 may be combined in a variety of ways.

Figure 3:
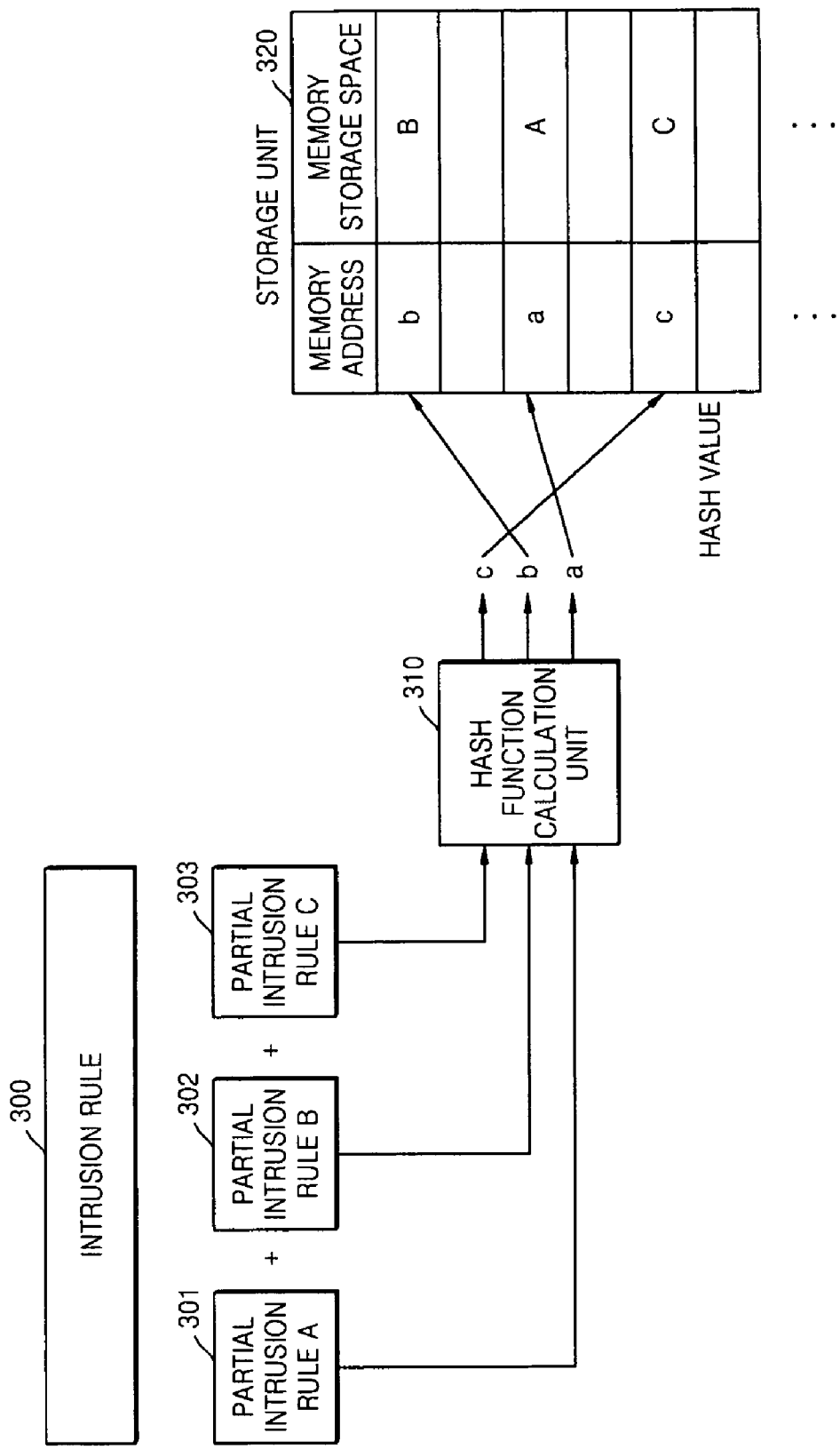
FIG. 3 illustrates calculating and storing hash values after dividing the intrusion rule in the division unit of FIG. 1 according to an embodiment of the present invention.

FIG. 3 illustrates calculating and storing hash values after dividing the intrusion rule in the division unit 160 of FIG. 1 according to an embodiment of the present invention. This example illustrates dividing an intrusion rule 300 into three partial intrusion rules, partial intrusion rule A 301, partial intrusion rule B 302, and partial intrusion rule C 303.

Partial intrusion rule A 301, partial intrusion rule B 302, and partial intrusion rule C 303 are input to a hash function calculation unit 310.

The hash function calculation unit 310 performs a hash function calculation for each of partial intrusion rule A 301, partial intrusion rule B 302, and partial intrusion rule C 303, and generates hash values a, b, and c. Then, the hash function calculation unit 310 outputs partial intrusion rule A 301 and hash value a, partial intrusion rule B 302 and hash value b, and partial intrusion rule C 303 and hash value c, to a storage unit 320.

The storage unit 320 stores partial intrusion rule A 301 and hash value a, partial intrusion rule B 302 and hash value b, and partial intrusion rule C 303 and hash value c that are input from the hash function calculation unit 310.

When an actual intrusion detection operation is performed using partial intrusion rules stored in the storage unit 320 in an intrusion detection system using a hash function, the hash value of an intrusion rule that is an object of the operation is calculated, and then an intrusion rule stored in a part of the storage unit 320 corresponding to the hash value is read so that the intrusion detection can be performed.

Figure 4:
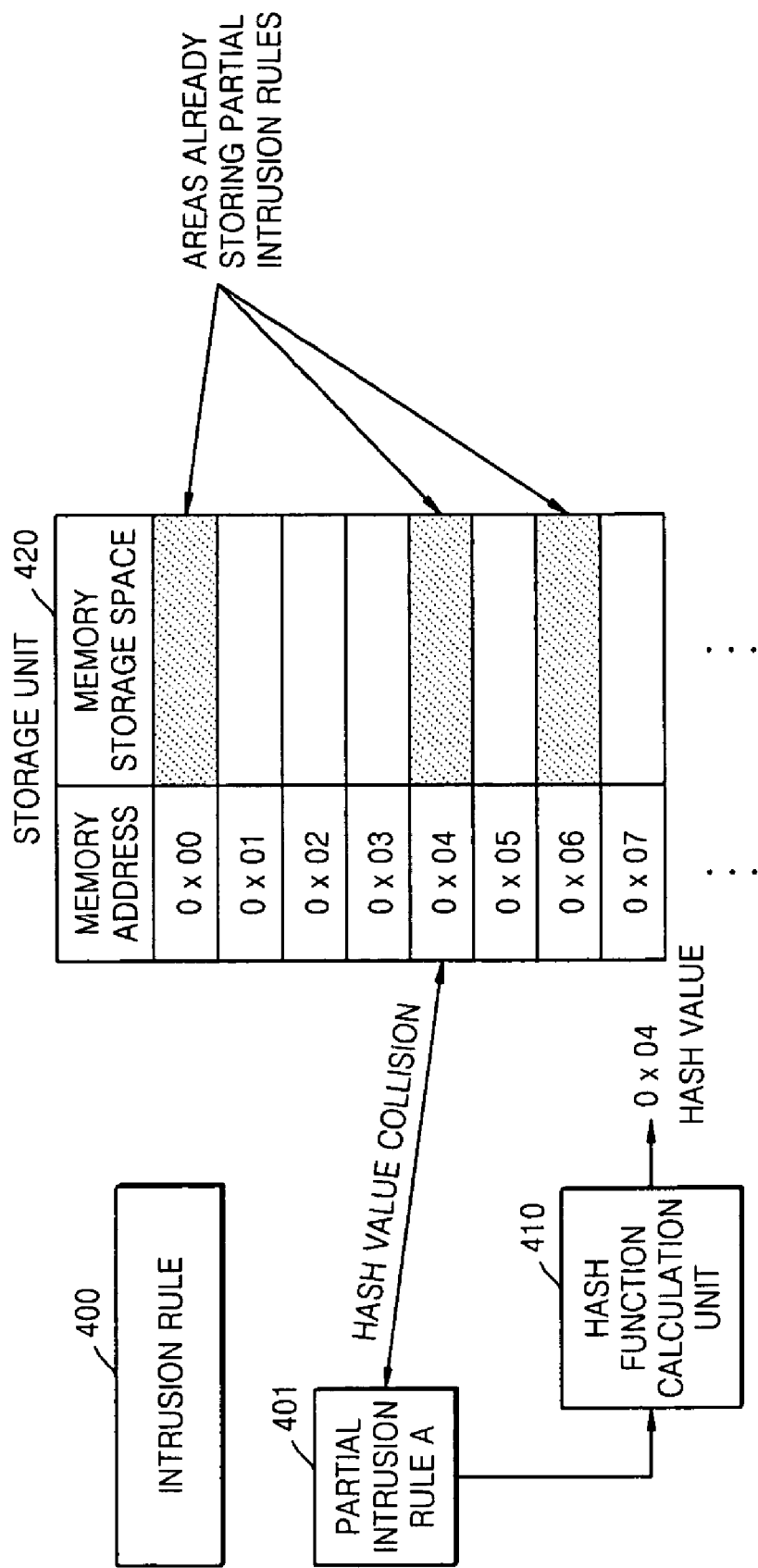
FIG. 4 illustrates collisions of hash values calculated in a hash value collision calculation unit of FIG. 1 according to an embodiment of the present invention.

FIG. 4 illustrates collisions of hash values calculated in the hash value collision calculation unit 140 of FIG. 1 according to an embodiment of the present invention. In FIG. 4, a memory area corresponding to the hash value of a partial intrusion rule is the same as that of another partial intrusion rule which is already stored.

A collision of a hash value in relation to partial intrusion rule A 401 divided from an intrusion rule 400 will now be explained in more detail.

Partial intrusion rule A 401 is input to the hash function calculation unit 410.

The hash function calculation unit 410 performs a hash function calculation for partial intrusion rule A 401, and generates a hash value, 0x04. Then, the hash function calculation unit 410 outputs the generated partial intrusion rule A 401 and hash value 0x04 to a storage unit 420.

The storage unit 420 wants to store partial intrusion rule A 401 input from the hash function calculation unit 410, at the corresponding memory address 0x04. However, a partial intrusion rule of another intrusion rule is already stored at memory address 0x04, causing a collision between hash values.

There are a variety of ways to prevent collision of hash values, but these methods decrease the performance of the intrusion detection system, increase the size of a memory, and complicate the hash function table.

Accordingly, a method is needed to solve the problems of low performance of the intrusion detection system, large memory, and complicated hash function table. One such method will now be explained.

FIG. 5 illustrates a method of minimizing collisions of hash values in the hash value collision calculation unit 140 of FIG. 1 according to an embodiment of the present invention.

Referring to FIG. 5, an intrusion rule 500 is defined in advance, is applied before or during operation of a high-speed intrusion detection system using a hardware-based hash function, and begins to be used from the time when the intrusion rule 500 is applied. Accordingly, by calculating the hash value of the intrusion rule 500 before applying the intrusion rule 500, it can be confirmed whether or not a hash value collision occurs between the intrusion rule 500 and intrusion rules already applied to the intrusion detection system. As described above, the intrusion rule 500 is divided into partial intrusion rules and stored in a storage unit (not shown), and a combination of divisions may vary in a variety of ways with respect to the size of division.

All possible division combinations are calculated with respect to the intrusion rule 500 to be newly stored in the high speed intrusion detection system using a hardware-based hash. FIG. 5 shows dividing the intrusion rule 500 according to a first division method 510, a second division method 520, and a third division method 530. Though only three division methods are shown in FIG. 5, division is performed in all possible combinations.

The first division method 510 divides the intrusion rule 500 into partial intrusion rule A 511, partial intrusion rule B 512, partial intrusion rule C 513, The second division method 520 divides the intrusion rule 500 into partial intrusion rule α 521, partial intrusion rule β 522, partial intrusion rule γ 523, . . .

The third division method 530 divides the intrusion rule 500 into partial intrusion rule x 531, partial intrusion rule y 532, partial intrusion rule z 533, . . .

A hash value with respect to each of the partial intrusion rules divided according to the first division method 510 is calculated by a hash function calculation unit (not shown), and the frequency of collisions between the hash value of the intrusion rule applied already, and the calculated hash value is calculated. FIG. 5 shows an example in which the hash value collides twice according to the first division method 510.

A hash value is calculated with respect to each of the partial intrusion rules divided according to the second division method 520 by the hash function calculation unit, and the frequency of collisions between the hash value of the intrusion rule applied already, and the calculated hash value is calculated. FIG. 5 shows an example in which the frequency of the hash value collisions according to the second division method 520 is 0.

A hash value with respect to each of the partial intrusion rules divided according to the third division method 530 is calculated by a hash function calculation unit (not shown), and the frequency of collisions between the hash value of the intrusion rule applied already, and the calculated hash value is calculated. FIG. 5 shows an example in which the hash value collides three times according to the third division method 530.

Based on this, the division combination which minimizes the frequency of hash value collisions with the intrusion rule already applied is determined, and partial intrusion rules divided according to that division combination are stored in a storage unit. Since the frequency of hash value collisions of the second division method 520 is 0 in FIG. 5, the partial intrusion rules divided according to the second division method 520 are stored in the storage unit.

Since the method as illustrated in FIG. 5 minimizes the hash value collisions, a variety of problems caused by hash value collisions can be reduced.

FIG. 6 is a flowchart of a method of storing an intrusion rule according to an embodiment of the present invention.

Referring to FIG. 6, first, a new intrusion rule to be newly stored is input in operation S600.

Then, a plurality of division combinations capable of dividing the new intrusion rule into partial intrusion rules are generated in operation S610.

The frequency of hash value collisions between each of the generated division combinations and the intrusion rule already stored is calculated in operation S620.

Among the hash value collision frequencies calculated in operation S620, the division combination having the lowest frequency is selected in operation S630.

The new intrusion rule input in operation S600 is divided into partial intrusion rules according to the division combination selected in operation S630, in operation S640.

A hash function calculation for each of the partial intrusion rules divided in operation S640 is performed in operation S650.

Next, the partial intrusion rules for which the hash function operations are performed are stored in a storage unit (for example, a memory) in operation S660.

FIGS. 1 through 5 can be referred to for those parts not explained with reference to FIG. 6.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and before optical data storage. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and detail may be made therein without departing from the spirit and scope of the present invention as defined by the following claims. The preferred embodiments should be considered in a descriptive sense only and not for purposes of limitation. Therefore, the scope of the invention is defined not by the detailed description of the invention but by the appended claims, and all differences within the scope will be construed as being included in the present invention.

The present invention relates to the method and apparatus for storing an intrusion rule, and has the following effects.

In a real-time intrusion detection system of a gigabit-level network, collisions of hash values can be minimized by using a hardware-based hash function.

The collisions of hash values in an intrusion detection system based on an intrusion rule increase the size of a hash function table and the complexity of implementation. However, the present invention reduces the size of a hash function table to minimize collisions of hash values, improve performance, and reduce size and cost of the intrusion detection system implemented by hardware.

Also, since the collisions of hash values are examined only when an intrusion rule is to be newly stored, it does not affect an actually-implemented hardware-based intrusion detection, and the intrusion rule can be divided into an appropriate division combination and stored.

What is claimed is:

1. A computer readable storage medium including instructions that, when executed by an intrusion detection system, cause the intrusion detection system to perform an intrusion rule storing method for storing a new intrusion rule in storage having already stored intrusion rules, the method comprising:
generating a plurality of division combinations, with each of the division combinations capable of dividing the new intrusion rule into a plurality of partial intrusion rules;
with respect to each division combination, calculating a hash value of each of partial intrusion rules that are included in the division combination, and calculating a frequency of collisions between the hash values of the division combination and the hash values of the intrusion rules already stored in the intrusion detection system;
dividing the new intrusion rule according to a division combination having the lowest calculated frequency of hash value collisions; and
storing the divided new intrusion rule in a corresponding position of the intrusion detection system.

2. The computer readable storage medium of claim 1, wherein the dividing of the new intrusion rule according to a division combination having the lowest calculated frequency of hash value collisions comprises:
selecting the division combination having the lowest frequency of the calculated hash value collisions; and
dividing the new intrusion rule into a plurality of partial intrusion rules according to the selected division combination.

3. The computer readable storage medium of claim 1, wherein the storing of the divided new intrusion rule in the intrusion detection system comprises:
performing a hash function calculation on each of the plurality of divided partial intrusion rules of the new intrusion rule; and
storing the divided partial intrusion rules of the new intrusion rule in locations corresponding to respective hash values that are the results of performing the hash function calculations of the intrusion detection system.

4. The computer readable storage medium of claim 1, wherein the intrusion detection system is a hardware-based intrusion detection system.

5. An intrusion rule storing apparatus comprising:
a storage unit which already stores intrusion rules;
a division combination generation unit generating division combinations, with each of the division combinations capable of dividing a new intrusion rule into a plurality of partial intrusion rules;
a hash function calculation unit to calculate a hash value of each of the partial intrusion rules of the new intrusion rule;
a hash value collision calculation unit to calculate, with respect to each division combination, a frequency of collisions between the hash values of the division combination and the hash values of the intrusion rules already stored in the storage unit; and
a division unit dividing the new intrusion rule according to one of the division combinations that has the lowest frequency of the calculated hash value collisions.

6. The apparatus of claim 5, further comprising a control unit controlling storage of the plurality of divided partial intrusion rules of the new intrusion rule in locations of the storage unit corresponding to the hash value that is the result of performing the hash function calculation.

7. The apparatus of claim 5, wherein the intrusion rule storing apparatus is applied to a hardware-based intrusion detection system.

* * * * *